UNITED STATES PATENT OFFICE.

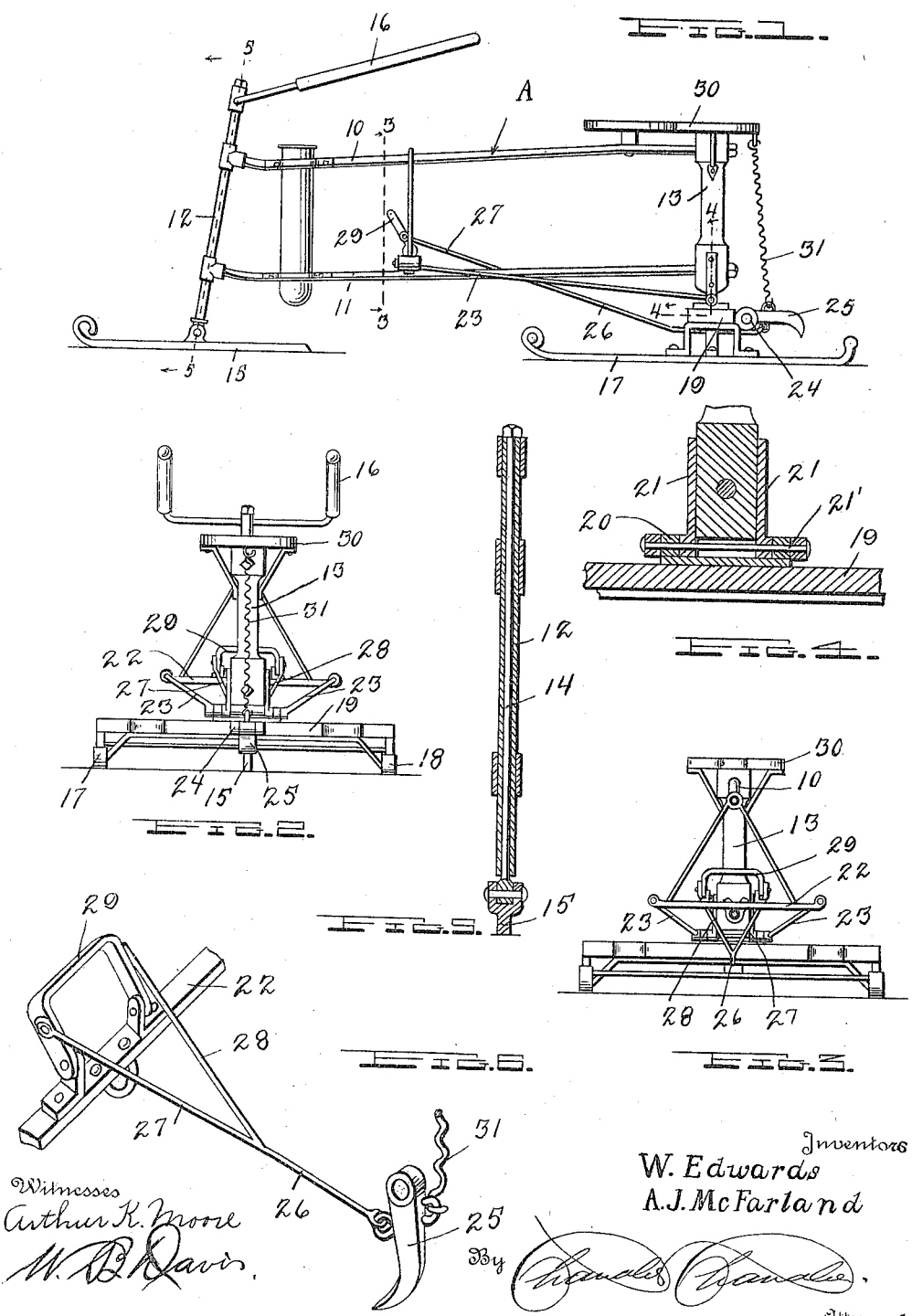

WILLIAM EDWARDS AND AUGUSTION J. McFARLAND, OF WEBSTERVILLE, VERMONT.

SLED.

1,181,124.　　　　　Specification of Letters Patent.　　Patented May 2, 1916.

Application filed September 21, 1914. Serial No. 862,730.

*To all whom it may concern:*

Be it known that we, WILLIAM EDWARDS and AUGUSTION J. MCFARLAND, citizens of the United States, residing at Websterville, in the county of Washington, State of Vermont, have invented certain new and useful Improvements in Sleds; and we do hereby declare the following to be a full, clear, and exact description of the invention, such as will enable others skilled in the art to which it appertains to make and use the same.

This invention relates to sleds and particularly those of the coasting type.

The object of the invention resides in the provision of a sled of the type named which embodies an improved construction whereby same may be easily steered and which further embodies an improved brake mechanism for controlling same.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a sled constructed in accordance with the invention; Fig. 2, a rear view thereof; Fig. 3, a section on the line 3—3 of Fig. 1; Fig. 4, a section on the line 4—4 of Fig. 1; Fig. 5, a section on the line 5—5 of Fig. 1, and Fig. 6, a perspective view illustrating the brake mechanism of the sled.

Referring to the drawings the sled is shown as comprising a frame A including upper and lower longitudinal members 10 and 11 respectively, a tubular front member 12 connecting the forward ends of the members 10 and 11 and a rear member 13 connecting the rear ends of the members 10 and 11. Rotatably mounted in the bore of the front member 12 is a steering rod 14 which has fixed to its lower end a runner 15 and to its upper end suitable handle bars 16 whereby the rod 14 may be rotated to effect the steering of the sled through the medium of the runner 15 as will hereinafter appear. The rear runners of the sled are indicated at 17 and 18 respectively and are connected by a transverse beam 19. Secured centrally to the beam 19 is a U-shaped member 20 which has pivoted on a rod 21' connecting the arms thereof arms 21 which are secured respectively to opposite sides of the member 13. Secured to the member 11 is a transverse foot bar 22 the terminals of which are connected to the rod 21' by means of braces 23. Secured centrally to the beam 19 on the rear side thereof is a bracket 24 to which is pivoted a brake dog 25. Secured to this brake dog is one end of a brake rod 26, the other end of said rod being forked to form arms 27 and 28 which are suitably connected to a foot pedal 29 pivoted on the bar 22. Mounted upon the member 10 and the upper end of the member 13 is a seat 30 which is connected to the brake dog 25 by means of a spring 31 which normally holds the free end of the brake dog in elevated position. In the use of the sled if it is desired to check the speed thereof or entirely stop the sled it is only necessary for the operator to push forward on the pedal 29 with his foot which will result in the free end of the dogs 25 being forced into engagement with the surface over which the sled is traveling which will produce sufficient resistance to slack the speed of or entirely stop the sled as desired.

What is claimed is:—

A sled comprising a pair of runners, a beam connecting said runners, a standard pivotally mounted on said beam, a pair of bars having their ends secured in said standards, sleeves on the other ends of said bars, a tubular member mounted in said sleeves and connecting the bars, a steering rod rotatably mounted in the tubular member, and a runner pivotally connected to the lower end of the steering rod.

In testimony whereof, we affix our signatures, in the presence of two witnesses.

WILLIAM EDWARDS.
AUGUSTION J. McFARLAND.

Witnesses:
NETTIE E. DICKEY,
MARION L. BELLOWS.

Copies of this patent may be obtained for five cents each, by addressing the "Commissioner of Patents, Washington, D. C."